United States Patent
Jafarian et al.

(10) Patent No.: US 9,736,862 B2
(45) Date of Patent: Aug. 15, 2017

(54) SYSTEMS AND METHODS FOR DELAY INDICATION IN A WIRELESS MESSAGE

(71) Applicant: QUALCOMM Incorporated, San Diego, CA (US)

(72) Inventors: Amin Jafarian, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 14/103,653

(22) Filed: Dec. 11, 2013

(65) Prior Publication Data

US 2014/0161064 A1    Jun. 12, 2014

Related U.S. Application Data

(60) Provisional application No. 61/736,520, filed on Dec. 12, 2012.

(51) Int. Cl.
*H04W 74/08*    (2009.01)
*H04W 28/04*    (2009.01)

(52) U.S. Cl.
CPC ... *H04W 74/0816* (2013.01); *H04W 74/0825* (2013.01); *H04W 74/0833* (2013.01); *H04W 28/04* (2013.01)

(58) Field of Classification Search
CPC ......... H04W 74/0816; H04W 74/0825; H04W 74/0833; H04W 28/04
USPC .......................... 370/252, 328, 329, 338, 401
See application file for complete search history.

(56) References Cited

U.S. PATENT DOCUMENTS

| | | | |
|---|---|---|---|
| 7,813,385 | B1 | 10/2010 | Hyun et al. |
| 7,948,911 | B2 | 5/2011 | Larsson |
| 2006/0274680 | A1* | 12/2006 | Zhu et al. ..................... 370/278 |
| 2008/0159243 | A1* | 7/2008 | Rofougaran .................. 370/338 |
| 2010/0046485 | A1 | 2/2010 | Merlin et al. |
| 2010/0085946 | A1* | 4/2010 | Sun et al. ..................... 370/336 |
| 2010/0284316 | A1 | 11/2010 | Sampathkumar |
| 2010/0329178 | A1 | 12/2010 | Cordeiro |
| 2011/0103280 | A1* | 5/2011 | Liu et al. ..................... 370/311 |
| 2011/0205969 | A1 | 8/2011 | Ahmad et al. |
| 2011/0261708 | A1 | 10/2011 | Grandhi |
| 2012/0044844 | A1 | 2/2012 | Trainin |
| 2012/0057622 | A1* | 3/2012 | Kimura et al. ............... 375/219 |

(Continued)

OTHER PUBLICATIONS

International Search Report and Written Opinion—PCT/US2013/074785—ISA/EPO—Mar. 17, 2014.

*Primary Examiner* — Christine Ng
(74) *Attorney, Agent, or Firm* — Knobbe, Martens, Olson & Bear

(57) ABSTRACT

Systems, methods, and devices for a delay indication in a wireless message are described herein. In one aspect an apparatus for wireless communication is provided. The apparatus includes a receiver configured to receive a first message from a second apparatus. In some aspects, the first message is a request-to-send (RTS) message. The access point further including a processing system, configured to generate a second message in response to reception of the first message. The second message comprising a delay indicator, the delay indicator indicating a delay after which a third message may be transmitted by the second apparatus, and a transmitter configured to transmit the second message to the second apparatus.

22 Claims, 4 Drawing Sheets

(56) References Cited

U.S. PATENT DOCUMENTS

2012/0320856 A1\* 12/2012 Kim et al. ................... 370/329
2013/0250904 A1\* 9/2013 Kang et al. ................. 370/329
2013/0294397 A1\* 11/2013 Lee et al. .................... 370/329

\* cited by examiner

SYSTEMS AND METHODS FOR DELAY INDICATION IN A WIRELESS MESSAGE

CROSS-REFERENCE TO RELATED APPLICATIONS

This application claims the benefit of U.S. Provisional Application 61/736,520, filed Dec. 12, 2012, and entitled "SYSTEMS AND METHODS FOR UPLINK DELAY INDICATION IN A CLEAR TO SEND MESSAGE," and assigned to the assignee hereof. The disclosure of this prior application is considered part of this application, and is hereby incorporated by reference in its entirety.

BACKGROUND

Field

The present application relates generally to wireless communications, and more specifically to systems, methods, and devices for providing a delay indication in a wireless message.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. Further, devices that are not actively transmitting/receiving information in the wireless network may enter a doze state to conserve power, where the devices do not actively transmit/receive information in the doze state. These devices may further utilize request-to-send and clear-to-send messages to indicate when a wireless device may request to send information to an access point (AP), and when the AP may be configured to receive information from the wireless device. Improved systems, methods, and devices for managing transmissions after a request-to-send are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

In some aspects, an apparatus is disclosed which comprises a receiver configured to receive a request-to send-message from another apparatus; a processing system configured to generate a clear-to-send message based on the reception, the clear-to-send message indicating whether to set a Network Allocation Vector (NAV); and a transmitter configured to transmit the clear-to-send message.

One aspect of the disclosure provides a method for wireless communication comprising receiving a request-to-send message from an apparatus; generating a clear-to-send message, the clear-to-send message indicating whether to set a Network Allocation Vector (NAV); and transmitting the clear-to-send message.

In some aspects, an apparatus for wireless communications is disclosed, the apparatus comprising means for receiving a request-to-send message from another apparatus; means for generating a clear-to-send message, the clear-to-send message indicating whether a Network Allocation Vector (NAV) is set; and means for transmitting the clear-to-send message.

In some aspects, a computer program product comprising a computer readable storage device encoded thereon with instructions that when executed cause an apparatus to perform a method of wireless communication is disclosed, said method comprising: receiving a request-to-send message from a station using an antenna; generating a clear-to-send message, the clear-to-send message indicating whether a Network Allocation Vector (NAV) is set; and transmitting the clear-to-send message.

One aspect of the disclosure provides an access point, comprising an antenna; a receiver configured to receive a request-to send-message from an apparatus using the antenna; a processing system configured to generate a clear-to-send message based on the reception, the clear-to-send message indicating whether to set a Network Allocation Vector (NAV); and a transmitter configured to transmit the clear-to-send message.

In some aspects, an apparatus is disclosed, comprising: a transmitter configured to transmit a request-to-send message to another apparatus; and a receiver configured to receive a clear-to-send message, the clear-to-send message indicating whether a network allocation vector (NAV) should be set.

In some aspects, a method for wireless communication is disclosed, the method comprising transmitting a request-to-send message to another apparatus using an antenna; and receiving a clear-to-send message, the clear-to-send message indicating whether a Network Allocation Vector (NAV) is set.

One aspect of the disclosure provides an apparatus for wireless communications comprising means for transmitting a request-to-send message to another apparatus; and means for receiving a clear-to-send message, the clear-to-send message indicating whether a Network Allocation Vector (NAV) is set.

One aspect of the disclosure provides a computer program product comprising a computer readable storage device encoded thereon with instructions that when executed cause an apparatus to perform a method of wireless communication, said method comprising transmitting a request-to-send message to another apparatus using an antenna; and receiving a clear-to-send message, the clear-to-send message indicating whether a Network Allocation Vector (NAV) is set.

One aspect of the disclosure provides a station, comprising an antenna; transmitting a request-to-send message to an apparatus using the antenna; and receiving a clear-to-send message, the clear-to-send message indicating whether a Network Allocation Vector (NAV) is set.

Another aspect disclosed is a first apparatus for wireless communication. The first apparatus includes a receiver configured to receive a first message from a second apparatus, a processing system configured to generate, in response to receiving the first message, a second message, the second message comprising a network allocation vector (NAV) indicator indicating whether to set a network allocation vector for transmission; and a transmitter configured to transmit the second message to the second apparatus.

In some aspects of the apparatus, the first message requests permission to transmit a third message, and the network allocation vector (NAV) indicator indicates whether to set a network allocation vector for transmission of the third message. In some aspects of the apparatus, the second message is a clear-to-send message. In some aspects of the apparatus, a receiver is configured to receive the third message from the second apparatus if the NAV indicator of the second message indicates the NAV is set. In some aspects of the apparatus, the second message further comprises a delay indicator, the delay indicator indicating a delay after which a third message may be transmitted by the second apparatus. In some aspects, the delay indicator includes a time value indicating a duration of the delay. In some aspects, the delay indicator includes is a flag indicating a duration of the delay. In some aspects, the first message comprises a duration field in which the delay indicator is located. In some aspects, a duration of the indicated delay is determined during an association between the first apparatus and the second apparatus. In some aspects, a duration of the indicated delay is computed based on one or more network parameters. In some aspects, the second message comprises a synchronization indicator indicating whether an additional message requesting permission to transmit the third message must be transmitted by the second apparatus before the third message can be transmitted.

Another aspect disclosed is a method for wireless communication. The method includes receiving, by a first apparatus, a first message from a second apparatus, generating a second message, the second message comprising a network allocation vector (NAV) indicator indicating whether to set a network allocation vector (NAV) for transmission; and transmitting the second message to a second apparatus. In some aspects, first message requests permission to transmit a third message, and wherein the network allocation vector indicator indicates whether to set a network allocation vector for transmission of the third message. In some aspects, the second message is a clear-to-send message. In some aspects, the method also includes receiving a third message from the second apparatus after the transmission of the second message if the NAV indicator indicated the NAV was set. In some aspects, the second message further comprises a delay indicator, the delay indicator indicating a delay after which a third message may be transmitted by the second apparatus. In some aspects, the delay indicator includes a time value indicating a duration of the delay. In some aspects, the method also includes determining a duration of the indicated delay during an association between the first apparatus and the second apparatus. In some aspects, the method also includes determining a duration of the indicated delay based on one or more network parameters. In some aspects, the delay indicator is a flag indicating a defined delay value. In some aspects, the second message comprises a duration field in which the delay indicator is located. In some aspects, the second message further comprises a synchronization indicator indicating whether an additional message requesting permission to transmit the second message must be transmitted by the second apparatus before the third message can be transmitted.

Another aspect disclosed is a first apparatus for wireless communication. The first apparatus includes a receiver configured to receive a first message from a second apparatus, the first message comprising a NAV indicator indicating whether a network allocation vector (NAV) should be set for transmission; and a processing system configured to determine whether to transmit a second message to the second apparatus in response to receiving the first message based on the NAV indicator. In some aspects, a processing system is configured to determine a delay before the NAV will be set based on a delay indicator in the first message, and wherein a transmitter is configured to transmit the second message after the determined delay. In some aspects, the processing system is further configured to determine the indicated delay based on a duration field of the second message. In some aspects, the processing system is further configured to determine whether to transmit an additional message requesting permission to transmit the second message based on a synchronization indicator in the first message, and wherein the transmitter is further configured to transmit the additional message if the synchronization indicator indicates the additional message is necessary, and configured to not transmit the additional message if the synchronization indicator indicates the additional message is not necessary.

Another aspect disclosed is a method for wireless communication. The method includes receiving a first message from a second apparatus, the first message comprising a NAV indicator indicating whether a network allocation vector (NAV) should be set for transmission, and transmitting the second message to the second apparatus in response to receiving the first message if the NAV indicator indicates the NAV is set. In some aspects, the method includes decoding the first message to determine a delay before the NAV will be set for the second message based on a delay indicator included in the first message; and transmitting the second message after the indicated delay. In some aspects, the method also includes determining the delay based on a duration field of the first message. In some aspects, the method also includes determining whether to transmit an additional message requesting permission to transmit the second message based on a synchronization indicator in the first message; transmitting the additional message if the synchronization indicator indicates the additional message is necessary; and not transmitting the additional message if the synchronization indicator indicates the additional message is not necessary.

Another aspect disclosed is a first apparatus for wireless communication. The first apparatus includes a receiver configured to receive a first message from a second apparatus, a processing system configured to generate, in response to receiving the first message, a second message, the second message comprising a delay indicator, the delay indicator indicating a delay after which a third message may be transmitted by the second apparatus, and a transmitter configured to transmit the second message to the second apparatus. In some aspects, the second message further comprises a network allocation vector (NAV) indicator, the network allocation vector (NAV) indicator indicating whether to set a network allocation vector (NAV) for transmission. In some aspects, the first message requests permission to transmit the third message, and the network allocation vector (NAV) indicator indicates whether to set the network allocation vector for transmission of the third message. In some aspects, a receiver is configured to receive the third message from the second apparatus if the NAV indicator of the second message indicates the NAV is set. In some aspects, the second message comprises a synchronization indicator indicating whether an additional message requesting permission to transmit the third message must be transmitted by the second apparatus before the third message can be transmitted. In some aspects, the delay indicator includes a time value indicating a duration of the delay. In some aspects, the delay indicator includes is a flag indicating a duration of the delay.

In some aspects, the first message comprises a duration field in which the delay indicator is located. In some aspects, a duration of the indicated delay is determined during a negotiation between the first apparatus and the second apparatus. In some aspects, a duration of the indicated delay is computed based on one or more network parameters.

Another aspect disclosed is a method for wireless communication. The method includes receiving, by a first apparatus, a first message from a second apparatus, generating a second message, the second message comprising a delay indicator, the delay indicator indicating a delay after which a third message may be transmitted by the second apparatus; and transmitting the second message to a second apparatus. In some aspects, the method further includes a network allocation vector indicator indicating whether to set a network allocation vector for transmission of the third message. In some aspects, the first message requests permission to transmit the third message, and wherein the network allocation vector indicator indicates whether to set the network allocation vector for transmission of the third message. In some aspects, the second message further comprises a synchronization indicator indicating whether an additional message requesting permission to transmit the third message must be transmitted by the second apparatus before the third message can be transmitted. In some aspects, the method also includes receiving the third message from the second apparatus after the transmission of the second message if the NAV indicator indicated the NAV was set. In some aspects, the delay indicator includes a time value indicating a duration of the delay. In some aspects, the method further includes determining a duration of the indicated delay during a negotiation between the first apparatus and the second apparatus. In some aspects, the method further includes determining a duration of the indicated delay based on one or more network parameters. In some aspects, the delay indicator is a flag indicating a defined delay value. In some aspects, the second message comprises a duration field in which the delay indicator is located.

Another aspect disclosed is a first apparatus for wireless communication. The first apparatus includes a receiver configured to receive a first message from a second apparatus, the first message comprising a delay indicator; and a processing system configured to transmit a second message to the second apparatus after a delay indicated by the delay indicator. In some aspects, a processing system is configured to determine whether a network allocation vector (NAV) will be set for transmission of the second message based on a network allocation vector (NAV) indicator in the first message. In some aspects, the processing system is further configured to determine the indicated delay based on a duration field of the first message. In some aspects, the processing system is further configured to determine whether to transmit an additional message requesting permission to transmit the second message based on a synchronization indicator in the first message, and the transmitter is further configured to transmit the additional message if the synchronization indicator indicates the additional message is necessary, and configured to not transmit the additional message if the synchronization indicator indicates the additional message is not necessary.

Another aspect disclosed is a method for wireless communication. The method includes receiving a first message from a second apparatus, the first message comprising a delay indicator; and transmitting a second message to the second apparatus after a delay indicated by the delay indicator. In some aspects, the method further includes decoding the first message to determine a whether a network allocation vector (NAV) will be set for the second message based on a network allocation vector (NAV) indicator included in the first message. In some aspects, the method further includes determining the delay based on a duration field of the first message. In some aspects, the method includes determining whether to transmit an additional message requesting permission to transmit the second message based on a synchronization indicator in the first message, transmitting the additional message if the synchronization indicator indicates the additional message is necessary; and not transmitting the additional message if the synchronization indicator indicates the additional message is not necessary.

Another aspect disclosed is a first apparatus for wireless communication. The first apparatus includes a receiver configured to receive a first message from a second apparatus, a processing system configured to generate, in response to receiving the first message, a second message, the second message comprising a delay indicator, the delay indicator indicating a delay after which a third message may be transmitted by the second apparatus; and a transmitter configured to transmit the second message to the second apparatus. In some aspects, the second message further comprises a network allocation vector (NAV) indicator, the network allocation vector (NAV) indicator indicating whether to set a network allocation vector (NAV) for transmission. In some aspects of the apparatus, the first message requests permission to transmit the third message, and the network allocation vector (NAV) indicator indicates whether to set the network allocation vector for transmission of the third message. In some aspects, a receiver is configured to receive the third message from the second apparatus if the NAV indicator of the second message indicates the NAV is set. In some aspects of the apparatus, the second message comprises a synchronization indicator indicating whether an additional message requesting permission to transmit the third message must be transmitted by the second apparatus before the third message can be transmitted. In some aspects, the delay indicator includes a time value indicating a duration of the delay. In some aspects, Another aspect disclosed is a first apparatus for wireless communication. The first apparatus includes a receiver configured to receive a first message from a second apparatus, a processing system configured to generate, in response to receiving the first message, a second message, the second message comprising a field having a value indicating whether there is a delay after which a third message may be transmitted by the second apparatus, and a transmitter configured to transmit the second message to the second apparatus. In some aspects, the second message further comprises a network allocation vector (NAV) indicator, the network allocation vector (NAV) indicator indicating whether to set a network allocation vector (NAV) for transmission. In some aspects, the first message requests permission to transmit the third message, and the network allocation vector (NAV) indicator indicates whether to set the network allocation vector for transmission of the third message. In some aspects, a receiver is configured to receive the third message from the second apparatus if the NAV indicator of the second message indicates the NAV is set. In some aspects, the second message comprises a synchronization indicator indicating whether an additional message requesting permission to transmit the third message must be transmitted by the second apparatus before the third message can be transmitted. In some aspects, the field includes a time value indicating a duration of the delay. In some aspects, the field includes a flag indicating a duration of the delay. In some aspects, a duration of the delay is determined during a negotiation between the first apparatus and the second apparatus. In some aspects, the field comprises a duration field, and further wherein there is a delay if the value is a first value and there is no delay if the value is a second value that is different from the first value.

Another aspect disclosed is a method for wireless communication. The method includes receiving, by a first apparatus, a first message from a second apparatus, generating a second message, the second message comprising a field, the having a value indicating whether there is a delay after which a third message may be transmitted by the second apparatus; and transmitting the second message to a second apparatus. In some aspects, the method also includes a network allocation vector indicator indicating whether to set a network allocation vector for transmission of the third message. In some aspects, the first message requests permission to transmit the third message, and wherein the network allocation vector indicator indicates whether to set the network allocation vector for transmission of the third message. In some aspects, the second message further comprises a synchronization indicator indicating whether an additional message requesting permission to transmit the third message must be transmitted by the second apparatus before the third message can be transmitted. In some aspects, the method also includes receiving the third message from the second apparatus after the transmission of the second message if the NAV indicator indicated the NAV was set. In some aspects, the field includes a time value indicating a duration of the delay. In some aspects, the method includes determining a duration of the delay after which a third message may be transmitted during a negotiation between the first apparatus and the second apparatus. In some aspects, the field is a flag indicating a defined delay value. In some aspects, the field comprises a duration field, and further wherein there is a delay if the value is a first value and there is no delay if the value is a second value that is different from the first value.

Another aspect disclosed is a first apparatus for wireless communication. The apparatus includes a receiver configured to receive a first message from a second apparatus, the first message comprising a field having a value indicating whether there is a delay after which a second message may be transmitted; and a processing system configured to transmit the second message to the second apparatus after the delay if the field indicates there is a delay. In some aspects, a processing system is configured to determine whether a network allocation vector (NAV) will be set for transmission of the second message based on a network allocation vector (NAV) indicator in the first message. In some aspects, the processing system is further configured to determine the delay based on a duration field of the first message. In some aspects, the processing system is further configured to determine whether to transmit an additional message requesting permission to transmit the second message based on a synchronization indicator in the first message, and the transmitter is further configured to transmit the additional message if the synchronization indicator indicates the additional message is necessary, and configured to not transmit the additional message if the synchronization indicator indicates the additional message is not necessary. In some aspects, the field comprises a duration field, and the processing system is further configured to determine there is a delay if the value is a first value and to determine there is no delay if the value is a second value that is different from the first value.

Another aspect disclosed is a method for wireless communication. The method includes receiving a first message from a second apparatus, the first message comprising a field having a value indicating whether there is a delay after which a second message may be transmitted; and a processing system configured to transmit the second message to the second apparatus after the delay if the field indicates there is a delay. In some aspects, the method also includes decoding the first message to determine whether a network allocation vector (NAV) will be set for the second message based on a network allocation vector (NAV) indicator included in the first message. In some aspects, the method also includes determining the delay based on a duration field of the first message.

In some aspects, the method also includes determining whether to transmit an additional message requesting permission to transmit the second message based on a synchronization indicator in the first message; transmitting the additional message if the synchronization indicator indicates the additional message is necessary; and not transmitting the additional message if the synchronization indicator indicates the additional message is not necessary. In some aspects, the field comprises a duration field, and the method further comprises determining there is a delay if the value is a first value and determining there is no delay if the value is a second value that is different from the first value.

DETAILED DESCRIPTION

Figure 1:
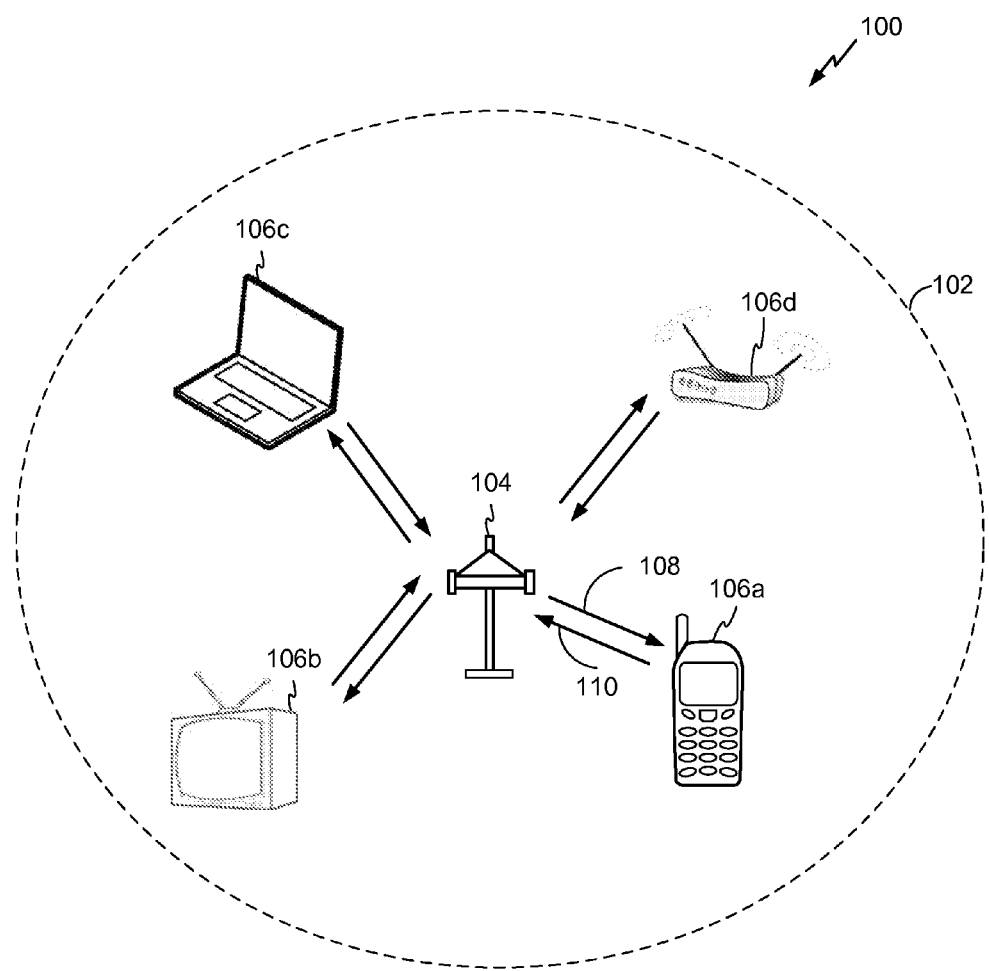
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP. A STA or an AP may be referred to as a node in a wireless communications network.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g., shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
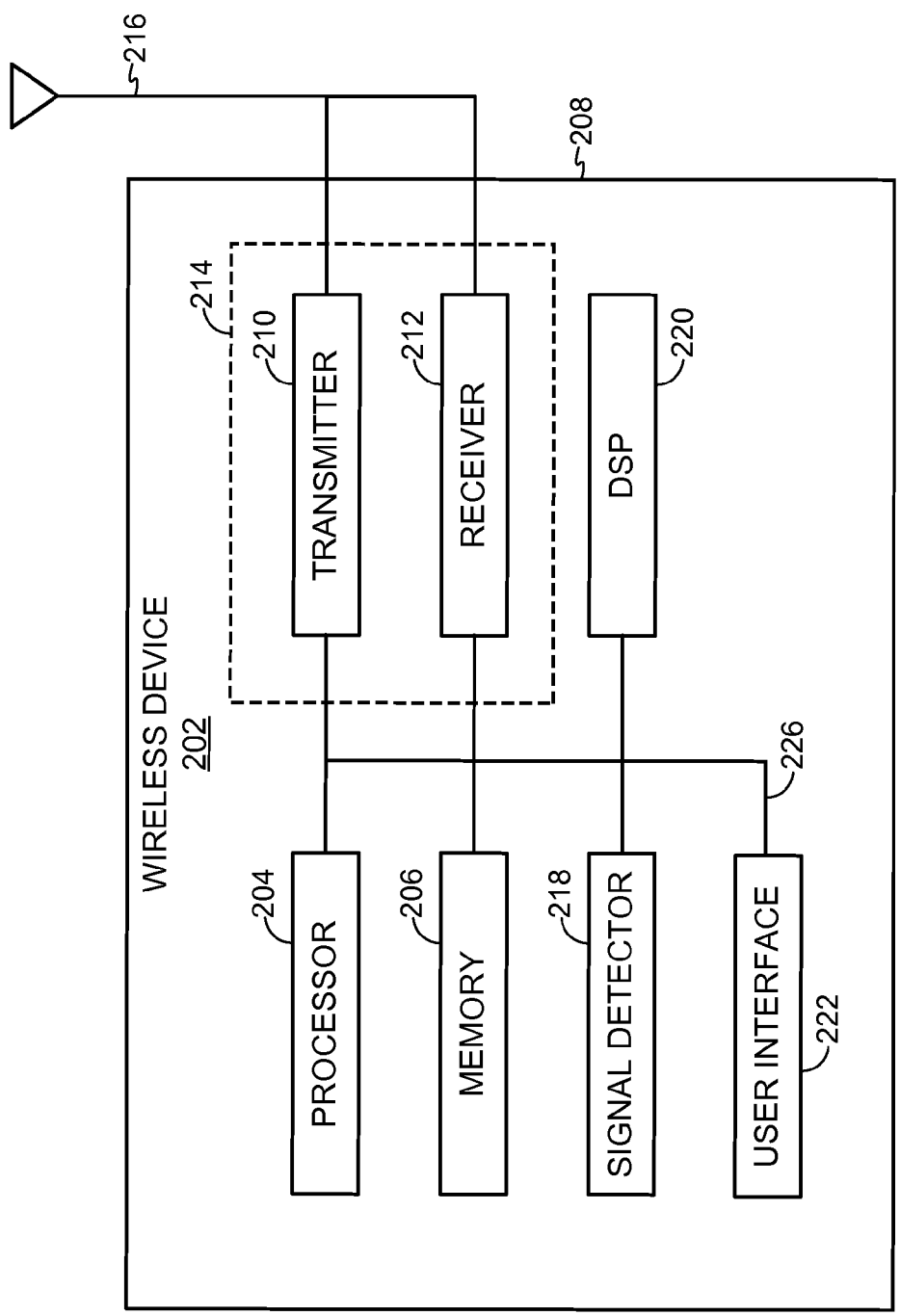
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 200 may be configured to operate in a low power or "doze" state where the wireless device 200 does not actively transmit/receive information. For example a portion or all of the transceiver 214 may be at least partially powered down.

The transmitter 210 may be configured to wirelessly transmit messages, which may be referred to as "paging messages" that are configured to indicate to other wireless devices whether or not the wireless devices need to wake up from a doze state and enter an awake state as discussed below. For example, the transmitter 210 may be configured to transmit paging messages generated by the processor 204, discussed above. When the wireless device 202 is implemented or used as a STA 106, the processor 204 may be configured to process paging messages. When the wireless device 202 is implemented or used as an AP 104, the processor 204 may also be configured to generate paging messages. The receiver 212 may be configured to wirelessly receive paging messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Wireless nodes, such as the wireless device 202 which map comprise an AP 104 or an STA 106, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble, which may be referred to as preamble detection. Further, the node may estimate a defer time or delay time from an acknowledge (ACK) indication in a signal (SIG) field, for instance. The preamble detection method may detect relatively weaker signals. Accordingly, there is a low detection threshold with this method. An alternative method is to detect some energy on the air, which may be referred to as energy detection. Energy detection may be used to sense one or more channels at one time. The energy detection method is relatively more difficult than detecting the start of a packet and may only detect relatively stronger signals. As such, there is higher detection threshold with this method relative to preamble detection. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Because with wireless data communications it is generally not possible to listen to the medium while transmitting on it, collision detection is not possible. Further, transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers or delays (i.e., does not transmit) for a period of time. The period of deferral is followed by a randomized backoff period (i.e., an additional period of time in which the node wishing to transmit will not attempt to access the medium). The backoff period is used to resolve contention between different nodes trying to access a medium at the same time. The backoff period may also be referred to as a contention window. Backoff requires each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential backoff algorithm wherein each time a node chooses a slot and collides with another node, it will increase the maximum number of the range exponentially. If, on the other hand, a node wishing to transmit senses the medium as free for a specified time (e.g., the Distributed Inter Frame Space (DIFS) in the 802.11 standard, or Point Coordination Function Inter Frame Space (PIFS) in other cases), then the node is allowed to transmit on the medium. After transmitting, the receiving node may perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

Additionally, a wireless network may implement virtual carrier sensing whereby a node wishing to transmit will first transmit a short control packet called a Request to Send (RTS) to a receiving node. The RTS may include a source, destination and duration of the transmission, including the responsive acknowledgment. If the medium is free, the receiving node will respond with a Clear to Send (CTS) message, which may include the same information as the RTS. Any node within range of either the RTS or CTS will set its virtual carrier sense indicator (also called Network Allocation Vector (NAV)) for the given duration and will defer from attempting to transmit on the medium during that period. Thus, implementing virtual carrier sensing reduces the probability of a collision at the receiving node by a hidden transmitting node. Use of RTS and CTS may also reduce overhead because the RTS and CTS message frames are relatively shorter than the full message frame intended to be transmitted by the transmitting node. That is, because the transmitting node may send and RTS and not receive a CTS, indicating that the receiver is busy, it has used less medium time as compared to sending a full data frame and not receiving an acknowledgement.

Previous implementations utilizing a request-to-send and clear-to-send exchange as described above may not provide for flow control. For example, if a first wireless device transmits a request-to-send message to a second wireless device, the second wireless device may transmit a clear-to-send message, indicating the station may transmit immediately. Alternatively, the second wireless device may not transmit a clear-to-send message. For example, if the second wireless device is unable to receive data at the present time, it may not respond to the request-to-send message with a clear-to-send message. When the first wireless device does not receive a clear-to-send message, the first wireless device may refrain from transmitting for a period of time. The first wireless device may then generate and transmit another request-to-send message to the second wireless device.

Methods and apparatus described herein provide for improvements in flow control when compared to known systems and methods. For example, some implementations of the proposed apparatus or methods may transmit a clear-to-send message that includes an indication that data may be transmitted at a later time. In some aspects, a duration field of the clear-to-send message may be used to indicate when data may be sent. In some implementations, the magnitude of the delay may be predefined at the time of an association between a transmitting station and a receiving access point. In other implementations, the delay may be based on a conditional target wakeup time (TWT).

These methods may provide for more efficient communication over a wireless network. For example, in known methods, if a wireless device with data to send transmits a request at a time when its intended receiver is unable to receive the data, the wireless device will wait for a time period until no clear-to-send message is transmitted by the intended receiver. The wireless device will then be required to contend for the medium again in order to retransmit a request-to-send message. Depending on whether the intended receiver is now available (and transmits a clear-to-send message in response), the wireless device may or may not be successful at transmitting data to its intended receiver during this second accept. Such an approach may result in inefficiencies in arranging a time when both the transmitting node may gain access to the medium and the receiving node is in a position to receive the data.

In contrast, with the proposed methods and apparatus, an intended receiver unable to receive data from a transmitting device when a request-to-send is transmitted may indicate in a clear-to-send message that data may be transmitted as some later time. At the later time, the transmitting device may then transmit the data to the intended receiver, without necessarily retransmitting a request-to-send message. Additionally, because the improved clear-to-send message indicates a time at which the NAV will be set, other wireless devices on the wireless network will refrain from transmitting during the indicated time period. Therefore, the transmitting device will not need to recontend for the wireless network at the later indicated time.

Figure 3A:
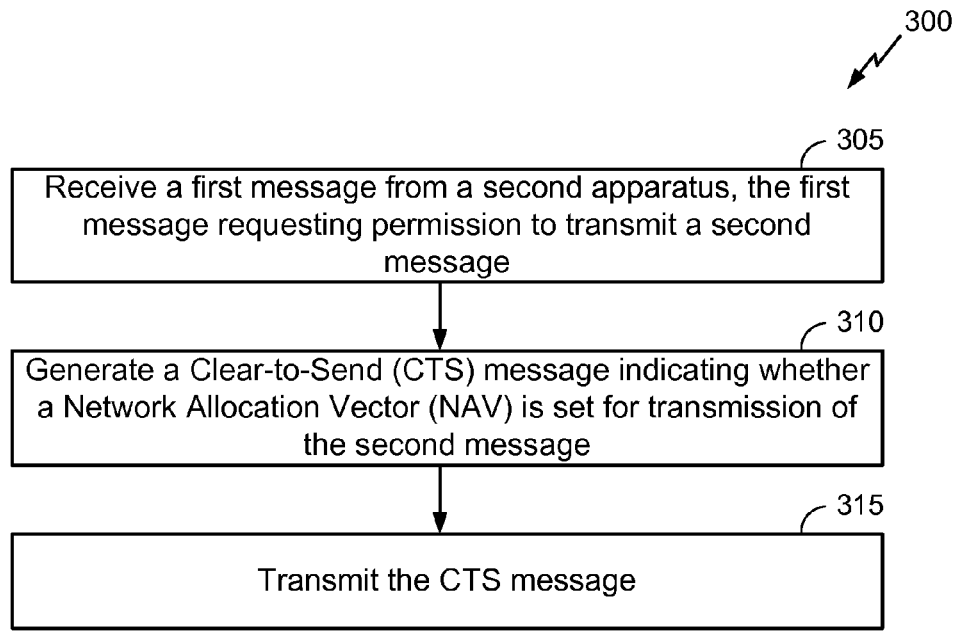
FIG. 3A is a flowchart of an exemplary method for transmitting a clear to send message that may indicate whether or not the NAV is set.

FIG. 3A is a flowchart of an exemplary method 300 for transmitting a clear to send message that may indicate whether or not the NAV is set. The exemplary method 300 of FIG. 3A may be carried out by the wireless device 202, such as an AP 104. The clear to send message transmitted by method 300 may improve flow control between a transmitting and receiving device as described above. For example, if a receiving device is unable to receive data from a transmitting device when a request to send message is received, the receiving device may transmit an improved clear-to-send message that indicates the NAV is not set. The clear-to-send message may further indicate a delay, after which, data may be transmitted to the receiving device. As described above, by indicating a delay for receiving data, the improved CTS message may provide for more efficient flow control between the transmitting and receiving devices than known methods.

At block 305, a first apparatus, or in some aspects the AP 104, receives a first message. The first message requests permission to transmit a second message. In some aspects, the first message is a request-to-send (RTS) message from a station, such as an STA 106. The STA 106 may be a station that is associated with the AP 104. The first message may indicate that STA 106 wishes to transmit information to AP 104. The first message may include a source, destination and duration of the transmission, the duration including the responsive acknowledgment. The AP 104, or other device performing process 300, may, for example, receive the first message using a receiver, which may be attached to an antenna. In one aspect, the means for receiving the first message from another apparatus may comprise a receiver or a processing system such as the processor 204.

At block 310, the first apparatus, or in some aspects the AP 104, generates a CTS message indicating whether to set a NAV for the second message. For example, if the AP 104 is available to receive messages and the medium is free, the AP 104 may indicate to the STA 106 that the medium is clear, and indicate to set the NAV for some period of time, in order to allow the STA 106 to transmit information, such as the second message, on the medium and to alert other devices not to transmit information during that time. However, the AP 104 may also indicate to the STA 106 not to set the NAV for the first message. This indication may alert the STA 106 that the medium is not free, and that the STA 106 should not transmit information on the medium at this time. The AP 104 may, for example, generate the CTS message using a processing system. In one aspect, the means for generating a clear-to-send message, the clear-to-send message indicating whether a Network Allocation Vector (NAV) is set may comprise a processing system, such as the processor 204.

In some aspects, the CTS message may comprise a delay indicator that indicates a delay to the receiver. This indication may be based, at least in part, on whether the NAV is to be set. For example, if the NAV is to be set, the delay may be only a short inter-frame space (SIFS). If the NAV is not to be set, the delay may be indicated by a duration field contained within the CTS message. This duration field may indicate a duration of time which the STA 106 should delay sending data. In some aspects, the delay may be pre-defined at the time of association between the STA 106 and the AP 104, or may be computed based upon some parameters by both the STA 106 and the AP 104. In some aspects, the CTS message may include a synchronization indicator, the synchronization indicator indicating whether t the STA 106 should send another RTS message after the delay and wait for a CTS message in response. In some aspects, the CTS message may indicate that the STA 106 should send information to the AP 104 without first sending another RTS message and waiting for a CTS message in response.

At block 315, the AP 104 transmits the CTS message. The CTS message may indicate whether to set a NAV for the first message. The NAV may either be set or may not be set. The CTS message may indicate a delay to the STA 106, after which the STA 106 may send another RTS message and/or transmit the information. In some aspects, means for transmitting the CTS message may include one or more of the transmitter 210 and/or the processor 204.

In some aspects, the AP 104 may be configured to receive data from the STA 106 in response to the transmission of the CTS message. For example, the AP 104 may be configured to receive the transmission of information from the STA 106, may be configured to receive another RTS message from the STA 106, or may be configured to receive other data from the STA 106.

The AP 104 may, for example, transmit the CTS message using a transmitter, which may be attached to an antenna. In one aspect, the means for transmitting the clear-to-send message may comprise a transmitter. In one aspect, the means for receiving data from the other apparatus in response to the transmission of the clear-to-send message based on the indication of the clear-to-send message may comprise a receiver.

Figure 3B:
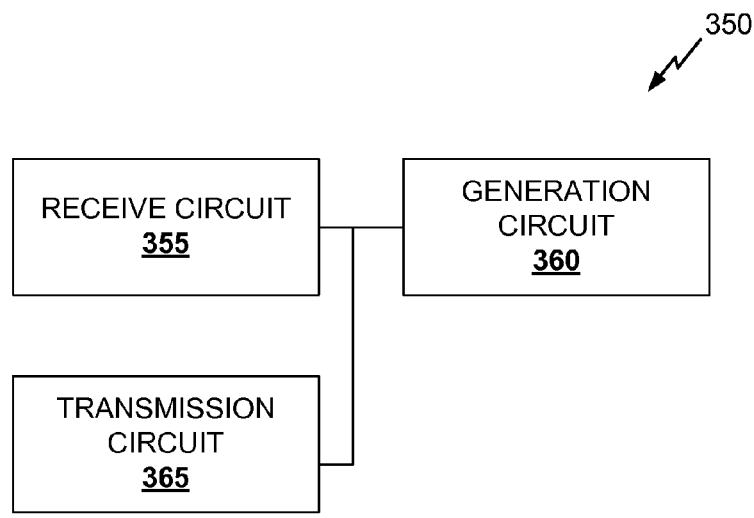
FIG. 3B is a functional block diagram of an exemplary wireless device that may be employed within a wireless communication system.

FIG. 3B is a functional block diagram of an exemplary wireless device 350 that may be employed within the wireless communication system 100. The device 350 comprises a receive circuit 355. The receive circuit 355 may be configured to perform one or more of the functions discussed above with respect to the block 305 illustrated in FIG. 3A. In some aspects, the receive circuit 355 may correspond to the processor 204 and/or the receiver 212. The device 350 further comprises a generation circuit 360. The generation circuit 360 may be configured to perform one or more of the functions discussed above with respect to block 310 illustrated in FIG. 3A. In some aspects, the generation circuit 360 may correspond to the processor 204. The device 350 further comprises a transmission circuit 365. The transmission circuit 365 may be configured to perform one or more of the functions discussed above with respect to block 315 illustrated in FIG. 3A. In some aspects, the transmission circuit 365 may correspond to the processor 204 and/or the transmitter 210.

Figure 4A:
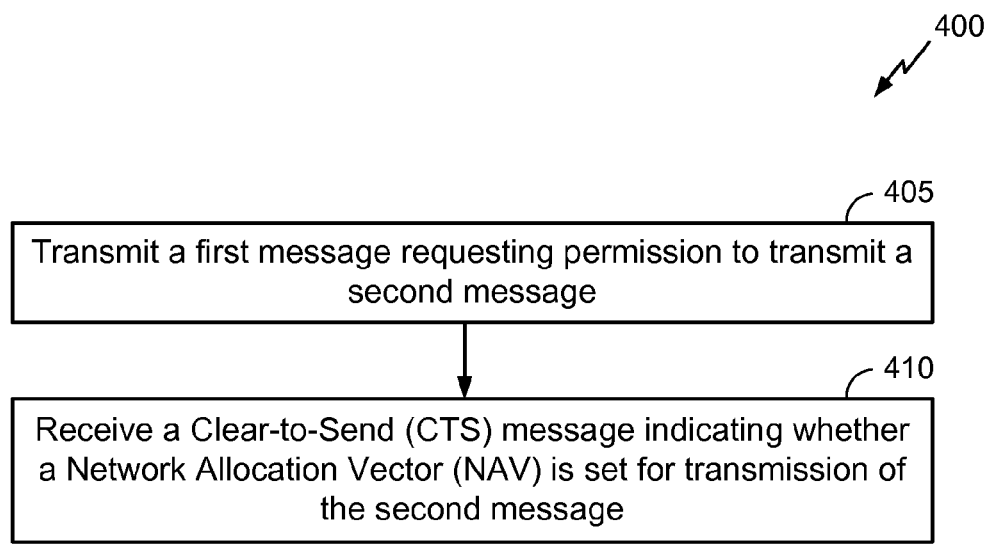
FIG. 4A is a flowchart of an exemplary method for receiving a clear to send message that may indicate whether or not the NAV is set.

FIG. 4A is a flowchart of an exemplary method 400 for receiving a clear to send message that may indicate whether or not the NAV is set. The exemplary method 400 of FIG. 4A may be carried out by the wireless device 202, such as an STA 106. The clear to send message received in method 400 may provide for improved flow control between a transmitting device and a receiving device. In some aspects, method 400 is performed by a transmitting device, that is, a device that intends to transmit data to a receiving device. As described above with respect to process 300, a clear to send message may indicate whether a NAV is set, thus indicating to a device receiving the clear-to-send message (the transmitting device described above) whether it may transmit data on the wireless network after reception of the clear-to-send message. In some implementations, the received clear-to-send message may also indicate a delay, after which the NAV will be set and the device receiving the clear-to-send message may transmit data to the receiving device.

At block 405, the STA 106 transmits a first message requesting permission to transmit a second message. In some aspects, the first message is an RTS message transmitted to an AP, such as the AP 104. The first message may indicate that STA 106 wishes to send information to AP 104 over a medium. The first message may include a source, destination and duration of the transmission, the duration including the responsive acknowledgment. In some aspects, a STA 106 may transmit this information to the AP using an antenna and a transmitter. In some aspects, the means for transmitting first message requesting permission to transmit the second message to another apparatus may comprise a transmitter and/or a processing system, such as processor 204.

At block 410, the STA 106 receives a clear-to-send (CTS) message, indicating whether to set a NAV for the first message. The clear to send (CTS) message may indicate that the NAV is either set or not set. The CTS may indicate a period of time in which the STA 106 may transmit information to the AP 104. If the NAV is not to be set by the device receiving the CTS, this may indicate that the STA 106 may not transmit information, such as the first message, to the AP 104 at this time. In some aspects, the means for receiving a clear-to-send message, the clear-to-send message indicating whether a Network Allocation Vector (NAV) is set may comprise a receiver and/or a processing system, such as the processor 204.

In some aspects, the STA 106 may be further configured to transmit data, such as the second message in response to receiving a CTS message from the AP 104. The STA 106 may be configured to transmit this data according to information received from the AP 104 in the CTS message. In some aspects, the CTS message may contain information regarding a delay. For example, the CTS message may indicate a delay in a duration field. In some aspects, the STA 106 may be configured to transmit another message requesting permission to transmit the second message prior to sending data to the AP 104, depending upon information or an indicator contained in the CTS, for example, in a synchronization indicator included in the CTS message. In some aspects, a CTS message may indicate via the synchronization indicator to the STA 106 that data such as the second message either can or cannot be transmitted without first sending another message requesting permission to transmit the second message, and the STA 106 may be configured to interpret and follow these instructions contained within the CTS. In some aspects, the additional message requesting permission may also be a request to send message.

In some aspects, the means for transmitting data in response to receiving the clear-to-send message based on the indication may comprise a transmitter and/or a processing system, such as the processor 204. In some aspects, the means for transmitting data after a delay indicated by the clear-to-send message may comprise a transmitter and/or a processing system, such as the processor 204. In some aspects, the means for transmitting data after a delay indicated by a duration field in the clear-to-send message may comprise a transmitter and/or a processing system, such as the processor 204. In some aspects, the means for transmitting data after a second request-to-send message was transmitted and second clear-to-send message was received, wherein the transmission of the second request-to-send message is based upon the indication in the clear-to-send message may comprise a transmitter and/or a processing system, such as the processor 204. In some aspects, the means for transmitting data without transmitting a second request-to-send message, based upon an indication in the clear-to-send message may comprise a transmitter, and/or a processing system, such as the processor 204.

Figure 4B:
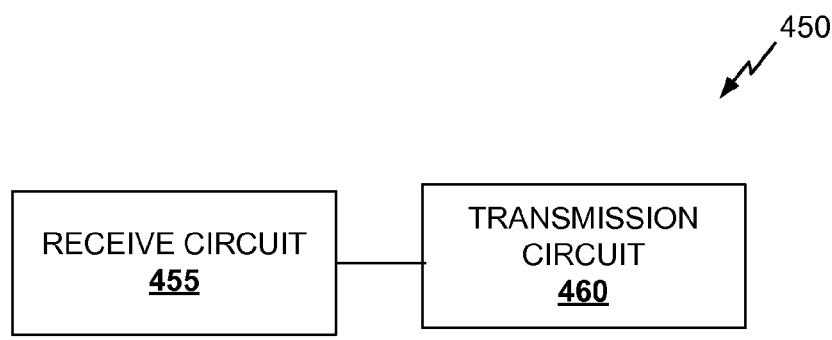
FIG. 4B is a functional block diagram of an exemplary wireless device that may be employed within a wireless communication system.

FIG. 4B is a functional block diagram of an exemplary wireless device 450 that may be employed within the wireless communication system 100. The device 450 comprises a receive circuit 455. The receive circuit 455 may be configured to perform one or more of the functions discussed above with respect to the block 405 illustrated in FIG. 4A. In some aspects, the receive circuit 455 may correspond to the processor 204 and/or the receiver 212. The device 450 further comprises a transmission circuit 460. The transmission circuit 460 may be configured to perform one or more of the functions discussed above with respect to block 410 illustrated in FIG. 4A. In some aspects, the transmission circuit 460 may correspond to the processor 204 and/or the transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A first apparatus for wireless communication over a wireless medium, comprising:
 a receiver configured to receive a first message from a second apparatus;
 a processing system configured to generate, after receiving the first message, a second message, the second message comprising:
  a field having a value indicating whether there is a delay after which a third message may be transmitted by the second apparatus, the delay being based at least in part on when the wireless medium will become available to the second apparatus,
  a synchronization indicator indicating whether, after the delay indicated in the second message, an additional message requesting permission to transmit the third message must be transmitted and a corresponding response must be received by the second apparatus before the third message can be transmitted, wherein if the synchronization indicator indicates that the additional message requesting permission need not be transmitted and the corresponding response need not be received, then the third message may be sent after the delay without transmitting the additional message, and
  a network allocation vector (NAV) indicator, the network allocation vector (NAV) indicator indicating whether to set a network allocation vector (NAV) for transmission; and
 an interface configured to output the second message for transmission to the second apparatus.

2. The apparatus of claim 1, wherein the first message requests permission to transmit the third message, and the network allocation vector (NAV) indicator indicates whether to set the network allocation vector for transmission of the third message.

3. The apparatus of claim 2, wherein the receiver is configured to receive the third message from the second apparatus if the NAV indicator of the second message indicates the NAV is set.

4. The apparatus of claim 1, wherein the field includes a time value indicating a duration of the delay.

5. The apparatus of claim 1, wherein the field includes a flag indicating a duration of the delay.

6. The apparatus of claim 1, further comprising determining a duration of the delay during a negotiation between the first apparatus and the second apparatus.

7. The apparatus of claim 1, wherein the field comprises a duration field, and further wherein there is a delay if the value is a first value and there is no delay if the value is a second value that is different from the first value.

8. The apparatus of claim 1, further comprising a transmitter configured to transmit the second message, wherein the apparatus is configured as an access point.

9. A method for wireless communication over a wireless medium, the method comprising:
 receiving, by a first apparatus, a first message from a second apparatus;
 generating a second message, the second message comprising:
  a field having a value indicating whether there is a delay after which a third message may be transmitted by the second apparatus, the delay being based at least in part on when the wireless medium will become available to the second apparatus,
  a synchronization indicator indicating whether, after the delay indicated in the second message, an additional message requesting permission to transmit the third message must be transmitted and a corresponding response received by the second apparatus before the third message can be transmitted, wherein if the synchronization indicator indicates that the additional message requesting permission need not be transmitted and the corresponding response need not be received, then the third message may be sent after the delay without transmitting the additional message, and
  a network allocation vector indicator indicating whether to set a network allocation vector for transmission; and
 outputting the second message for transmission to the second apparatus.

10. The method of claim 9, wherein the first message requests permission to transmit the third message, and wherein the network allocation vector indicator indicates whether to set the network allocation vector for transmission of the third message.

11. The method of claim 10, further comprising receiving the third message from the second apparatus after the transmission of the second message if the NAV indicator indicated the NAV was set.

12. The method of claim 9, wherein the field includes a time value indicating a duration of the delay.

13. The method of claim 9, further comprising determining a duration of the delay after which a third message may be transmitted during a negotiation between the first apparatus and the second apparatus.

14. The method of claim 9, wherein the field is a flag indicating a defined delay value.

15. The method of claim 9, wherein the field comprises a duration field, and further wherein there is a delay if the value is a first value and there is no delay if the value is a second value that is different from the first value.

16. A first apparatus for wireless communication over a wireless medium, comprising:
 a receiver configured to receive a first message from a second apparatus, the first message comprising:
  a field having a value indicating whether there is a delay after which a second message may be transmitted, the delay being based at least in part on when the wireless medium will become available to the second apparatus, and
  a synchronization indicator indicating whether, after the delay, an additional message requesting permission to transmit the second message must be transmitted and a corresponding response must be received by the first apparatus before the second message may be transmitted, wherein if the synchronization indicator indicates that the additional message requesting permission need not be transmitted and the corresponding response need not be received, then the second message may be sent after the delay without transmitting the additional message;
 a processing system configured to determine, after the delay, whether to transmit the additional message and receive the corresponding response based on the synchronization indicator in the first message; and
 an interface configured to output the second message for transmission to the second apparatus after the delay if the field indicates there is a delay, wherein, based on the determination, the transmitter is further configured to transmit the additional message to the second apparatus and the receiver is further configured to receive the corresponding response before the transmitter transmits the second message, and wherein the processing system is further configured to determine whether a network allocation vector (NAV) will be set for transmission of the second message based on a network allocation vector (NAV) indicator in the first message, and wherein the processing system is further configured to set the NAV for transmission of the second message.

17. The apparatus of claim 16, wherein the processing system is further configured to determine the delay based on a duration field of the first message.

18. The apparatus of claim 16, wherein the field comprises a duration field, and the processing system is further configured to determine there is a delay if the value is a first value and to determine there is no delay if the value is a second value that is different from the first value.

19. The apparatus of claim 16, further comprising a transmitter configured to transmit the second message and the additional message, wherein the apparatus is configured as an access terminal.

20. A method for wireless communication over a wireless medium, the method comprising:
   receiving a first message from a second apparatus, the first message comprising:
      a field having a value indicating whether there is a delay after which a second message may be transmitted, the delay being based at least in part on when the wireless medium will become available to the second apparatus, and
      a synchronization indicator indicating whether, after the delay indicated in the first message, an additional message requesting permission to transmit the second message must be transmitted and a corresponding response received by the first apparatus before the second message may be transmitted, wherein if the synchronization indicator indicates that the additional message requesting permission need not be transmitted and the corresponding response need not be received, then the second message may be sent after the delay without transmitting the additional message;
   determining whether a network allocation vector (NAV) will be set for transmitting the second message based on a network allocation vector (NAV) indicator included in the first message;
   determining, after the delay indicated in the second message, whether to transmit the additional message and receive the corresponding response based on the synchronization indicator in the first message;
   based on the determination, transmitting the additional message and receiving the corresponding response before transmitting the second message; and
   outputting the second message for transmission to the second apparatus after the delay if the field indicates there is a delay.

21. The method of claim 20, further comprising determining the delay based on a duration field of the first message.

22. The method of claim 20, wherein the field comprises a duration field, and the method further comprises determining there is a delay if the value is a first value and determining there is no delay if the value is a second value that is different from the first value.

* * * * *